United States Patent
Schill

(10) Patent No.: US 9,042,145 B2
(45) Date of Patent: May 26, 2015

(54) CIRCUIT CONFIGURATION WITH A STEP-UP CONVERTER, AND INVERTER CIRCUIT HAVING SUCH A CIRCUIT CONFIGURATION

(75) Inventor: Christoph Schill, Ravensburg (DE)

(73) Assignee: Platinum GmbH, Wangen (DE)

( * ) Notice: Subject to any disclaimer, the term of this patent is extended or adjusted under 35 U.S.C. 154(b) by 231 days.

(21) Appl. No.: 13/080,791

(22) Filed: Apr. 6, 2011

(65) Prior Publication Data

US 2011/0188277 A1 Aug. 4, 2011

Related U.S. Application Data

(63) Continuation-in-part of application No. 13/017,060, filed on Jan. 31, 2011.

(30) Foreign Application Priority Data

Jan. 29, 2010 (DE) .......................... 10 2010 006 124

(51) Int. Cl.
*H02M 7/155* (2006.01)
*H02M 7/537* (2006.01)
*H02J 7/34* (2006.01)
*H02J 1/10* (2006.01)
*H02J 1/00* (2006.01)

(52) U.S. Cl.
CPC ..................... *H02M 7/537* (2013.01)

(58) Field of Classification Search
USPC ................ 323/222–224; 363/15–16, 40, 131; 307/44, 45, 54, 58, 80–82
See application file for complete search history.

(56) References Cited

U.S. PATENT DOCUMENTS

| 3,459,957 A | 8/1969 | Kelley | |
| 6,747,881 B2 * | 6/2004 | Schreiber | ........................ 363/37 |

(Continued)

FOREIGN PATENT DOCUMENTS

| DE | 10 2004 037 446 | 6/2006 |
| DE | 102006014780 A1 | 10/2007 |

(Continued)

*Primary Examiner* — Matthew Nguyen
*Assistant Examiner* — Henry Lee, III
(74) *Attorney, Agent, or Firm* — Laurence A. Greenberg; Werner H. Stemer; Ralph E. Locher

(57) ABSTRACT

An inverter circuit contains a first and second DC sources for providing a DC voltage, a common step-up converter for boosting the DC voltage, an intermediate circuit capacitor connected between the outputs of the common step-up converter, and an inverter for converting the DC voltage provided by the capacitor into an AC voltage. The common step-up converter contains a series circuit having a first inductance and a first rectifier element and is connected between an output of the first DC source and one side of the intermediate circuit capacitor as well as a series circuit which includes a second inductance and a second rectifier element and is connected between an output of the second DC source and another side of the intermediate circuit capacitor. The common step-up converter further contains a common switching element which is connected between the first and second DC sources.

14 Claims, 3 Drawing Sheets

(56) References Cited

U.S. PATENT DOCUMENTS

| | | | |
|---|---|---|---|
| 6,963,497 B1 | 11/2005 | Herbert | |
| 7,138,730 B2* | 11/2006 | Lai | 307/82 |
| 7,646,182 B2 | 1/2010 | Nakabayashi et al. | |
| 7,741,817 B2 | 6/2010 | Lasagni | |
| 8,648,497 B2* | 2/2014 | Stern | 307/82 |
| 2004/0165408 A1* | 8/2004 | West et al. | 363/131 |
| 2005/0068010 A1* | 3/2005 | Chen et al. | 323/210 |
| 2005/0174817 A1* | 8/2005 | Schmidt et al. | 363/97 |
| 2005/0270816 A1* | 12/2005 | Nielsen | 363/142 |
| 2010/0072819 A1* | 3/2010 | Lee et al. | 307/77 |

FOREIGN PATENT DOCUMENTS

| | | |
|---|---|---|
| DE | 10 2008 050 402 A1 | 4/2010 |
| EP | 2 001 111 A2 | 12/2008 |
| WO | 2006106417 A1 | 10/2006 |

* cited by examiner

FIG. 1
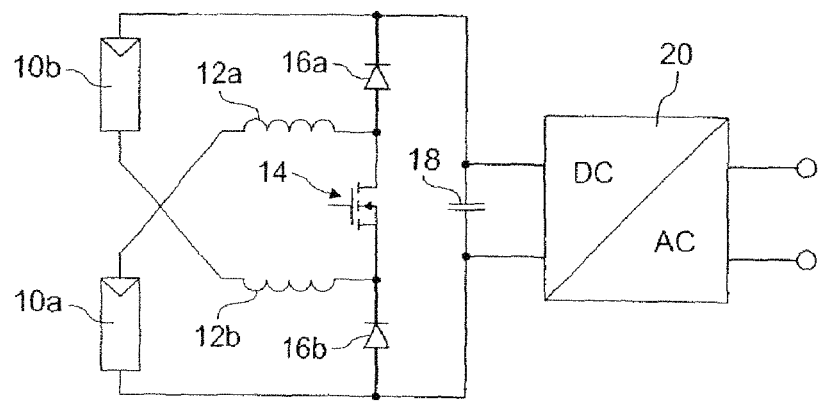
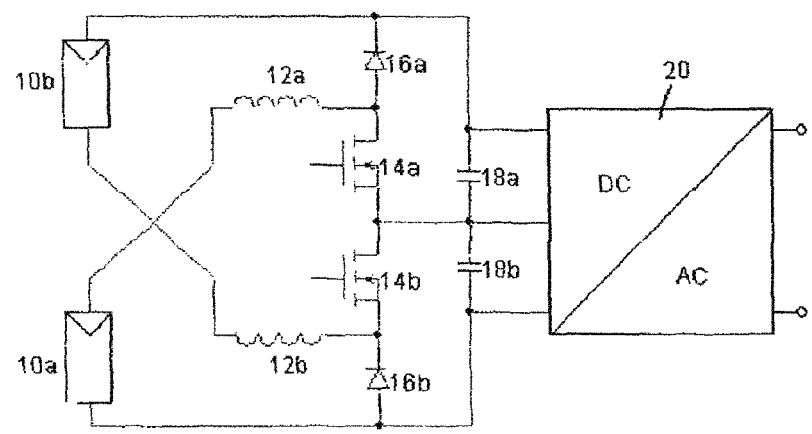
FIG. 3

CIRCUIT CONFIGURATION WITH A STEP-UP CONVERTER, AND INVERTER CIRCUIT HAVING SUCH A CIRCUIT CONFIGURATION

CROSS-REFERENCE TO RELATED APPLICATIONS

This application is a continuation-in-part (CIP) of copending patent application Ser. No. 13/017,060, filed Jan. 31, 2011; the application also claims the priority, under 35 U.S.C. §119, of German patent application DE 10 2010 006 124.7, filed Jan. 29, 2010; furthermore, the instant application includes certain disclosure from my prior-filed German patent application 10 2008 050 402.5, filed Oct. 4, 2008; the prior applications are herewith incorporated by reference in its entirety.

BACKGROUND OF THE INVENTION

Field of the Invention

The present invention relates to a circuit configuration having a step-up converter for boosting a provided DC voltage and to an inverter circuit having such a circuit configuration. The present invention relates, in particular, to a circuit configuration having a step-up converter for boosting a DC voltage provided by a photovoltaic generator and to a solar inverter circuit having such a circuit configuration.

In order to generate an AC voltage, an inverter generally requires an intermediate circuit voltage, or a link voltage, of a particular magnitude. An optimum degree of efficiency is achieved if this intermediate circuit voltage is precisely matched to the AC voltage to be generated.

Photovoltaic generators usually provide a greatly fluctuating DC voltage depending on the incidence of light, the temperature and the number of connected modules. The broader the operating range of the input DC voltage which can be processed by an inverter, the more possibilities there are of finding appropriate module combinations during installation. An input voltage range of 1:2 at full load and of 1:2.5 from full load to no-load operation is often desirable.

In order to match the DC voltage provided by the photovoltaic generator to the inverter, a circuit configuration having a so-called step-up converter which boosts the variable DC voltage to a relatively constant intermediate circuit voltage is therefore generally used. The structure of a conventional standard converter circuit (step-up converter) is illustrated in FIG. 4.

A photovoltaic generator 10 provides a variable DC voltage. The step-up converter which contains an inductor or choke 12, a circuit-breaker 14 and a diode 16 is used to raise the voltage to the intermediate circuit voltage which is applied to an intermediate circuit capacitor 18. The downstream inverter 20 then converts the intermediate circuit voltage into an AC voltage.

In order to boost the DC voltage from the photovoltaic generator 10, the circuit-breaker 14 is periodically switched on and off. In this case, the duty ratio is selected using an analogue or digital controller in such a manner that the desired intermediate circuit voltage is set. When the circuit-breaker 14 is closed, current flows from the photovoltaic generator 10 into the inductor 12 and is buffered there. If the circuit-breaker 14 is then opened, the current flows from the photovoltaic generator 10 into the intermediate circuit capacitor 18 via the diode 16, the energy previously stored in the inductor 12 also being delivered to the intermediate circuit capacitor 18.

FIG. 5 shows a development of this standard converter circuit, as is known, for example, from published, non-prosecuted German patent application DE 10 2004 037 446 A1. The converter circuit illustrated in FIG. 5 differs from the standard circuit from FIG. 4 by the symmetrical configuration of two inductors 12a and 12b and the additional diode 16b which is required for reasons of symmetry. The method of operation of this converter circuit is the same as that of the standard converter circuit described above. The symmetrical distribution of the inductors 12a, 12b causes the photovoltaic generator 10 to be at another voltage level with respect to ground, which is desired in particular types of solar modules.

However, the use of a step-up converter in an inverter circuit also results in losses which reduce the overall efficiency of the inverter circuit. In the modified circuit configuration from FIG. 5, there are also losses of the second diode 16b, as a result of which the overall efficiency becomes even lower. In addition, the use of a step-up converter is always also associated with additional weight, volume and costs.

The mentioned problems of these conventional circuit configurations also occur in other types of DC sources and when the DC voltage provided is used directly, that is to say without the use of the inverter.

U.S. Pat. No. 3,459,957 shows a circuit configuration having batteries as the DC source. The batteries can be connected either in series or in parallel with one another using a switch formed by a transistor. A capacitor sums the voltage dropped across it. A coil is provided in this case and is arranged after combining the branches respectively formed from one of the batteries and one of the diodes.

Those of skill in the art will immediately recognize that this circuit cannot be used for photovoltaic inverters, because the potential of the photovoltaic generators used as DC-sources alternates with high frequency against ground. This would cause inacceptable radio frequency interferences and ground currents because of the large capacitance of the solar generators against ground potential.

SUMMARY OF THE INVENTION

It is accordingly an object of the invention to provide a circuit configuration having a step-up converter, and an inverter circuit having such a circuit configuration which overcomes the above-mentioned disadvantages of the prior art devices of this general type. The invention is based on the object of providing an improved circuit configuration having a DC source and a step-up converter.

With the foregoing and other objects in view there is provided, in accordance with the invention, a circuit configuration, comprising:

a DC source having a first DC source and a second DC source each providing a DC voltage;

a step-up converter having outputs, the step-up converter being a common step-up converter for boosting both the DC voltage provided by the first DC source and the DC voltage provided by the second DC source, the common step-up converter containing at least one switching element connected between the first and second DC sources; and an intermediate circuit capacitor connected between the outputs of the step-up converter.

In accordance with an added feature of the invention, the common step-up converter includes a series circuit of a first inductance and a first rectifier element which is connected between an output of the first direct-current source and one side of the intermediate circuit capacitor and a series circuit of a second inductance and a second rectifier element which is connected between an output of the second direct-current source and another side of the intermediate circuit capacitor.

In other words, the circuit configuration contains a DC source for providing a DC voltage, a step-up converter for boosting the DC voltage provided by the DC source, and an intermediate circuit capacitor which is connected between the outputs of the step-up converter. In this case, the DC source has a first DC source and a second DC source, and the step-up converter is provided as a common step-up converter for raising both the DC voltage provided by the first DC source and the DC voltage provided by the second DC source. The common step-up converter also contains a series circuit which consists of a first choke (for example an inductor) and a first rectifier element (for example a freewheeling diode or an active circuit-breaker) and is connected between an output of the first DC source and one side of the intermediate circuit capacitor as well as a series circuit which contains a second inductance and a second rectifier element and is connected between an output of the second DC source and another side of the intermediate circuit capacitor. According to the invention, there is provided at least one switching element, which is connected between the first and second DC sources, preferably between the connection between the first inductance and the first rectifier element and the connection between the second inductance and the second rectifier element.

In this circuit configuration, a common step-up converter is used for a first DC source and a second DC source. As a result, the energy which must be buffered in the step-up converter or the circulating reactive power is considerably smaller. As a result, the losses of the step-up converter are considerably reduced, thus increasing the overall efficiency of the circuit configuration. Further advantages lie in a reduced cooling capacity on account of the better efficiency, a reduction in the load on the semiconductor components of the step-up converter, lower requirements when designing the individual components and a relatively small number of components needed to achieve a high degree of efficiency.

In particular, the common step-up converter may contain a common switching element which is connected between the first and second DC sources. The common switching element is connected, for example, between the connection between the first inductance and the first rectifier element and the connection between the second inductance and the second rectifier element. In addition, the common switching element is preferably a circuit-breaker which can be clocked at a fixed or variable frequency.

Furthermore, the first and second DC sources may be partial current sources of a DC source which are connected in parallel or in series. For example, the first and second DC sources are different (partial) strings of a solar module or a photovoltaic generator.

Furthermore, the first and second inductances of the common step-up converter may either be coupled to one another or formed separately from one another.

The above-described circuit configuration of the invention can advantageously be used in an inverter circuit which, in addition to this circuit configuration, has an inverter for converting the DC voltage provided by the intermediate circuit capacitor into an AC voltage. In this case, two or more step-up converters connected in parallel or in series may also be connected to the input connections of the inverter or to the intermediate circuit capacitor.

The use of at least two circuit-breakers (that is to say two, three, four or more circuit-breakers) for the common switching element of the common step-up converter makes it possible to considerably reduce the voltage load on the individual semiconductor components in each case. With a suitable choice of components, this may result in better efficiency of the overall circuit configuration.

In one preferred refinement of the invention, the at least two circuit-breakers are connected between the connection between the first inductance and the first rectifier element and the connection between the second inductance and the second rectifier element.

In another refinement of the invention, the intermediate circuit capacitor is formed by at least two capacitances connected in series (that is to say two, three, four or more capacitances).

In yet another refinement of the invention, a connection between two capacitances of the intermediate circuit capacitor is connected to a connection between two circuit-breakers.

Furthermore, the at least two circuit-breakers may be synchronously clocked. In the alternative, the at least two circuit-breakers may be clocked separately.

The circuit configuration according to the invention can be advantageously used in an inverter circuit which, in addition to the circuit configuration, has an inverter for converting the DC voltage provided by the intermediate circuit capacitor into an AC voltage.

In one refinement of the invention, the intermediate circuit capacitor is formed by at least two capacitances connected in series, and the inverter is connected to a connection between two capacitances of the intermediate circuit capacitor.

In another refinement of the invention, at least two step-up converters connected in parallel or in series are connected to the input connections of the inverter or to the intermediate circuit capacitor.

Other features which are considered as characteristic for the invention are set forth in the appended claims.

Although the invention is illustrated and described herein as embodied in a circuit configuration having a step-up converter, and an inverter circuit having such a circuit configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a schematic illustration of a structure of an inverter circuit according to the invention;

FIG. 3 is a schematic illustration of the structure of an inverter circuit according to an exemplary embodiment according to the invention;

DETAILED DESCRIPTION OF THE INVENTION

Figure 2:
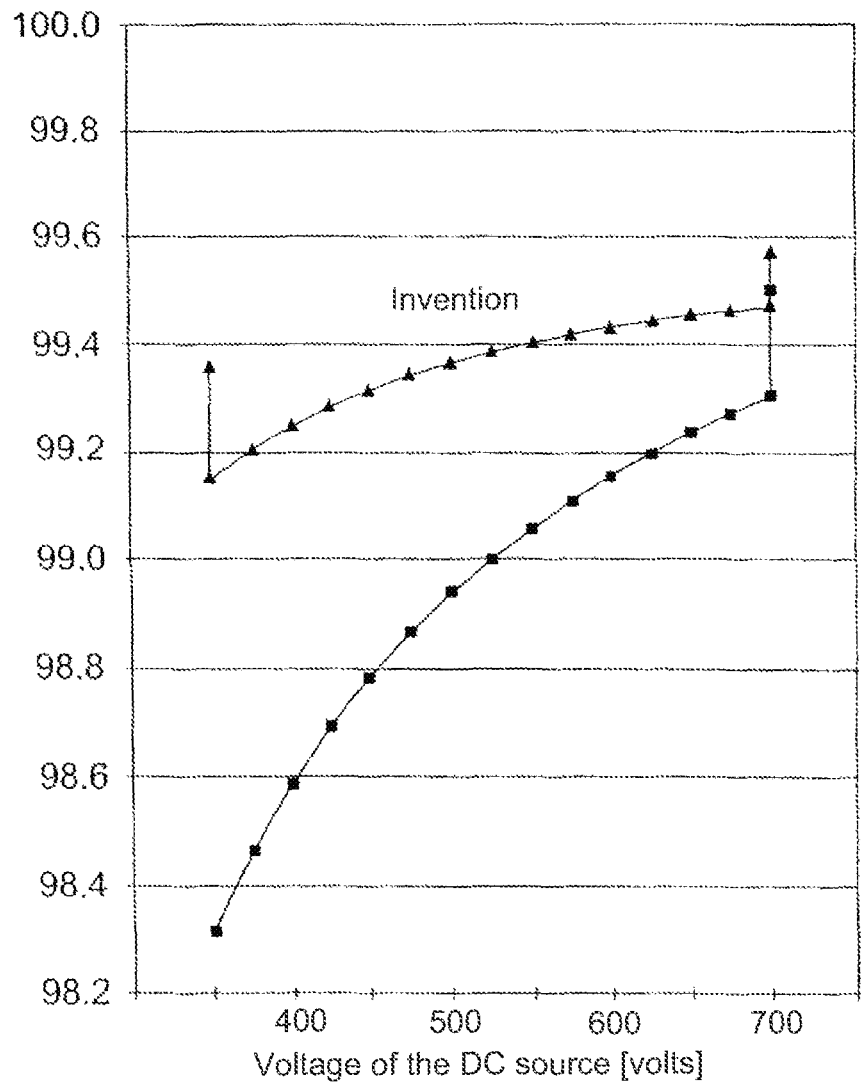
FIG. 2 is a graph illustrating an improvement in efficiency of the step-up converter circuit from FIG. 1 in comparison with prior art circuit configurations.

Referring now to the figures of the drawing in detail and first, particularly, to FIG. 1 thereof, there is shown a structure of an inverter circuit according to the invention.

The photovoltaic generator which forms the DC source is divided into two (partial) strings 10a, 10b which each provide a DC voltage. The first and second DC sources 10a, 10b are preferably symmetrical, that is to say they generate essentially the same DC voltage in order to achieve the best results. The voltage in each string 10a, 10b at full load is typically in the range between approximately 50% and approximately 100% of the intermediate circuit voltage. This achieves an input voltage range of approximately 1:2 at full load.

The division of a photovoltaic generator 10 into two partial strings 10a and 10b is not a restriction in higher-power inverters since a plurality of identical partial strings are usually connected in parallel anyway.

Both DC sources 10a, 10b are connected to a common step-up converter 12-16, downstream of which an intermediate circuit capacitor 18, also referred to as a link capacitor 18, and finally an inverter 20 are connected. As illustrated in FIG. 1, the common step-up converter 12-16 contains a series circuit which has a first inductor 12a and a first diode 16a and is connected between an output of the first DC source 10a and one side of the intermediate circuit capacitor 18 as well as a series circuit which has a second inductor 12b and a second diode 16b and is connected between an output of the second DC source 10b and another side of the intermediate circuit capacitor 18.

Figure 4:
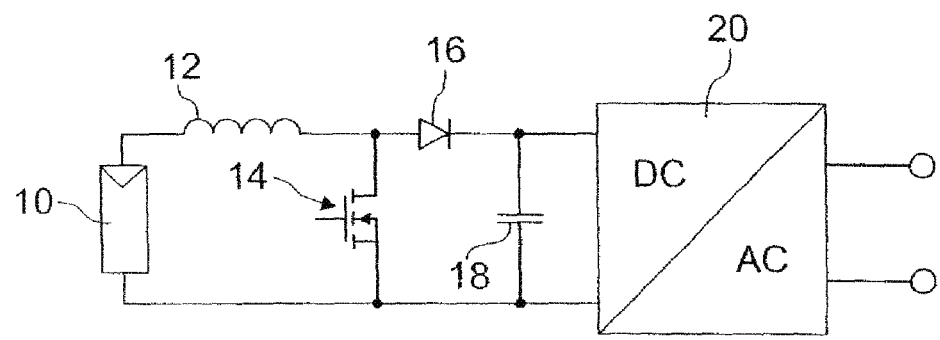
FIG. 4 is a schematic illustration of the structure of a conventional step-up converter circuit according to the prior art.

The common step-up converter 12-16 also contains a common circuit-breaker 14 which is connected between the first and second DC sources 10a, 10b in such a manner that it is connected between the connection between the first inductor 12a and the first diode 16a and the connection between the second inductor 12b and the second diode 16b. In this manner, the two DC sources 10a, 10b are in series when the circuit-breaker 14 is closed and are in parallel when the switch 14 is open via the first and second diodes 16a, 16b. In contrast to the conventional circuit configurations from FIG. 4 and FIG. 5, energy is delivered into the intermediate circuit capacitor 18 both when the circuit-breaker 14 is closed and when the circuit-breaker 14 is open.

As a result, the energy which must be buffered in the inductors 12a, 12b of the step-up converter 12-16 or the reactive power circulating in the step-up converter is considerably smaller. Consequently, the two inductors 12a, 12b must be only approximately half as large and the load on the circuit-breaker 14 and also other semiconductor components is reduced. The losses in the step-up converter are considerably reduced, the overall efficiency of the inverter circuit is greater and the cooling capacity required is lower.

If the DC voltage in the two strings 10a, 10b is approximately 50% or approximately 100% of the desired intermediate circuit voltage, a static series or parallel connection of the two DC sources 10a, 10b suffices to generate the intermediate circuit voltage. No switching losses are therefore produced in the circuit-breaker 14. If the DC voltages in the two strings 10a, 10b are each in the range between approximately 50% and 100% of the intermediate circuit voltage, the circuit-breaker 14 is operated in a clocked manner. The duty ratio is controlled using a controller (not illustrated, analog or digital, for example a conventional PWM control circuit) in such a manner that the desired intermediate circuit voltage is produced. The duty ratio may vary between 100% (that is to say static series connection of 10a and 10b) and 0% (that is to say static parallel connection of 10a and 10b).

Figure 5:
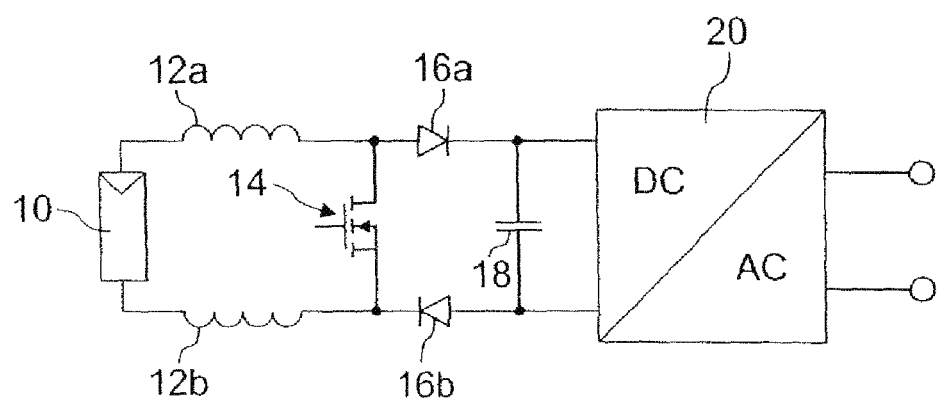
FIG. 5 is a schematic illustration of the structure of a further conventional step-up converter circuit according to the prior art.

In order to illustrate the improved method of operation of this circuit configuration in comparison with conventional circuit configurations having step-up converters, FIG. 2 shows a comparison of the efficiencies of the step-up converters against the DC voltages provided by the current sources. The overall efficiencies of the step-up converters 12-16 for the conventional circuit configuration from FIG. 4 (shown as the lower curve ■ in FIG. 2) and for the circuit configuration from FIG. 1 (shown as the upper curve Δ in FIG. 2) are plotted for the operating conditions of full load, a constant clock frequency of the circuit-breaker 14 and an intermediate circuit voltage of 700 volts. The overall efficiency of the modified conventional circuit configuration from FIG. 5 is somewhat below that from FIG. 4.

It is noted that, for a DC voltage of 700 volts, the step-up converter 12-16 is not clocked, as a result of which the switching losses of the circuit-breaker 14 are omitted in both cases. In the circuit configuration from FIG. 1, this is also possible at a DC voltage of 350 volts as a result of the static series connection of the two partial strings 10a, 10b.

FIG. 2 clearly shows that the efficiency of the step-up converter and thus also the overall efficiency of the inverter circuit could be considerably improved by the circuit configuration from FIG. 1 with a small outlay on components. In addition, it can also be stated that the dependence of the efficiency or the losses of the step-up converter on the DC voltage provided by the photovoltaic generator 10 is considerably smaller.

The circuit-breaker 14 can be driven either at a fixed or at a variable frequency. If the DC voltage in the partial strings 10a, 10b is in the vicinity of 50% or 100% of the intermediate circuit voltage, the clock frequency of the circuit-breaker 14 can be reduced, for example, in order to reduce the switching losses. At values of 50% and 100% of the desired intermediate circuit voltage, the step-up converter is preferably not clocked but rather the two DC sources 10a, 10b are operated in a manner statically connected in parallel or in series. With such static operation, the semiconductors can be bridged with a relay, for example, in order to increase the efficiency further.

Instead of the diodes, it is also possible, as a further option, to use active circuit-breakers as the first and second rectifier elements 16a, 16b.

The step-up converter 12-16 may also be constructed from two or more branches which operate in a parallel manner and possibly with a phase offset (multiphase operation). In this case, individual branches may be entirely disconnected in the event of a partial load in order to increase the partial load efficiency.

In order to reduce the switching losses, ring-around networks may optionally be installed (resonant switching).

Furthermore, two or more step-up converters 12-16 may also be connected in parallel or in series at the input of the inverter 20.

Different topologies may be used for the inverter 20 itself. Half-bridges (for single-phase supply) and three-phase bridges are suitable, for example.

Instead of the photovoltaic generators described above, other supplying sources may also be used for the first and second DC sources 10a, 10b. For example, fuel cells, thermoelectric generators, electromagnetic generators, rechargeable batteries, super-capacitors and the like are also suitable as DC sources of the circuit configuration according to the invention.

Another exemplary embodiment of a circuit configuration according to the invention is explained in more detail below with reference to FIG. 3. In this case, identical or corresponding components are denoted using the same reference numerals as in the circuit configuration from FIG. 1.

The circuit configuration in this exemplary embodiment differs from the circuit configuration, as shown in FIG. 1, in that two circuit-breakers 14a and 14b are connected between the first and second DC sources 10a, 10b, more precisely between the connection between the first inductor 12a and the first diode 16a and the connection between the second inductor 12b and the second diode 16b. In other words, the common switching element 14 of the common step-up converter 12-16 is formed by two circuit-breakers 14a, 14b.

In a similar manner, the intermediate circuit capacitor 18 is also formed from two capacitances 18a and 18b connected in series.

Furthermore, a connection between the two circuit-breakers 14a, 14b is connected in an electrically conductive manner to a connection between the two capacitances 18a, 18b. Moreover, the inverter 20 is additionally connected to the center tap between the two capacitances 18a, 18b.

The voltage load on the semiconductor components used in the circuit configuration can be halved in this manner. This in turn allows even better efficiency of the inverter circuit if the components are selected in a correspondingly suitable manner.

In one embodiment, the two circuit-breakers 14a, 14b may be synchronously clocked. In this case, the two inductors 12a, 12b may be either separate or coupled.

This variant exhibits a similar behavior to the circuit configuration from FIG. 1 having only one circuit-breaker 14. However, additional mutual influence with the inverter 20 is obtained via the center tap between the two capacitances 18a, 18b.

In another embodiment, the two circuit-breakers 14a and 14b are clocked separately and the two inductors 12a and 12b are also separate.

In the case of different solar radiation for the two strings 10a and 10b of the photovoltaic generator 10, asymmetry occurs between the voltages provided by the two capacitances 18a, 18b of the intermediate circuit capacitor, which asymmetry must be compensated for by the downstream inverter 20. In this case, the maximum permissible asymmetry depends on the photovoltaic voltage in the strings 10a, 10b and the ability of the inverter 20 to stabilize the neutral point between the two capacitances 18a, 18b.

In this second embodiment variant of the circuit in FIG. 3, it is possible to use separate drive devices for the two circuit-breakers 14a, 14b, for example in the form of MPPTs (maximum power point tracker). However, the control of the circuit configuration becomes somewhat more complicated overall.

The invention is naturally not only restricted to the exemplary embodiments illustrated in FIGS. 1 and 3 described above. Those of skill in the pertinent art will appreciate that various modifications and variants are available that lie within the scope of protection defined by the appended claims.

For example, it is conceivable to operate with different partial strings 10a, 10b by using different numbers of solar modules in the partial strings, for example. The step-up converter circuit 12-16 can also be configured for this situation without any problems even if the improvement in the efficiency diminishes with increasing asymmetry.

Whereas two circuit-breakers 14a, 14b and two capacitances 18a, 18b are used for the common switching element and the intermediate circuit capacitor, respectively, in the exemplary embodiment from FIG. 3, it is likewise possible to respectively use three, four or more of these components.

The circuit configuration according to the invention having DC sources 10a, 10b, a step-up converter 12-16 and an intermediate circuit capacitor 18, 18a, 18b, cannot only be used in combination with the downstream inverter 20, as illustrated in FIG. 1 and FIG. 3. The circuit configuration of the invention can advantageously also be used, for example, to directly supply DC loads or to supply DC voltage intermediate circuits in other devices, for example motor frequency converters.

The invention claimed is:

1. A circuit configuration, comprising:
   a DC source having a first DC source and a second DC source, said first DC source and said second DC source each providing a DC voltage and each having a positive output and a negative output;
   a step-up converter having a positive output and a negative output, said step-up converter being a common step-up converter for boosting both the DC voltage provided by said first DC source and the DC voltage provided by said second DC source, said step-up converter including at least one switching element connected between said first and second DC sources; and
   an intermediate circuit capacitor connected between said positive output and said negative output of said step-up converter;
   said positive output of said first DC source being connected to said positive output of said step-up converter, and said negative output of said second DC source being connected to said negative output of said step-up converter;
   said negative output of said first DC source being non-switchably and DC connected to said negative output of said step-up converter, and said positive output of said second DC source being non-switchably and DC connected to said positive output of said step-up converter;
   said step-up converter including a series circuit of a first inductance and a first rectifier element connected between said positive output of said first DC source and said positive output of said step-up converter;
   said step-up converter including a series circuit of a second inductance and a second rectifier element connected between said negative output of said second DC source and said negative output of said step-up converter; and
   said at least one switching element of said step-up converter being connected between said first DC source and said second DC source in such a manner that the two DC sources are in series when all of said at least one switching element are closed and the two DC sources are in parallel when all of said at least one switching element are open.

2. The circuit configuration according to claim 1, wherein said at least one switching element is connected between a node formed between said first inductance and said first rectifier element and a node formed between said second inductance and said second rectifier element.

3. The circuit configuration according to claim 1, wherein said intermediate circuit capacitor has at least two capacitances connected in series.

4. The circuit configuration according to claim 3, wherein said step-up converter includes a plurality of switching elements connected between said first and second DC sources, said at least one switching element is one of said plurality of switching elements, and a connection between said at least two capacitances of said intermediate circuit capacitor is connected to a connection between two of said plurality of switching elements.

5. The circuit configuration according to claim 1, wherein said at least one switching element includes at least two switching elements which are synchronously clocked.

6. The circuit configuration according to claim 1, wherein said at least one switching element includes at least two switching elements which are clocked separately.

7. The circuit configuration according to claim 1, wherein said at least one switching element is switched with a fixed timing frequency.

8. The circuit configuration according to claim 1, wherein said at least one switching element is switched with a variable timing frequency.

9. The circuit configuration according to claim 1, wherein said first and second inductances of the step-up converter are configured to be coupled to one another.

10. The circuit configuration according to claim 1, wherein said first and second inductances of the step-up converter are separate from one another.

11. The circuit configuration according to claim 1, wherein said first and second direct-current sources are two strings or part-strings of a photovoltaic generator.

12. An inverter circuit, comprising:
a circuit configuration, including:
a DC source having a first DC source and a second DC source, said first DC source and said second DC source each providing a DC voltage and each having a positive output and a negative output;
a step-up converter having a positive output and a negative output, said step-up converter being a common step-up converter for boosting both the DC voltage provided by said first DC source and the DC voltage provided by said second DC source, said step-up converter including at least one switching element connected between said first and second DC sources; and
an intermediate circuit capacitor connected between said positive output and said negative output of said step-up converter; and
an inverter for converting a DC voltage provided by said intermediate circuit capacitor into an AC voltage;
said positive output of said first DC source being connected to said positive output of said step-up converter, and said negative output of said second DC source being connected to said negative output of said step-up converter;
said negative output of said first DC source being non-switchably and DC connected to said negative output of said step-up converter, and said positive output of said second DC source being non-switchably and DC connected to said positive output of said step-up converter;
said step-up converter including a series circuit of a first inductance and a first rectifier element connected between said positive output of said first DC source and said positive output of said step-up converter;
said step-up converter including a series circuit of a second inductance and a second rectifier element connected between said negative output of said second DC source and said negative output of said step-up converter; and
said at least one switching element of said step-up converter being connected between said first DC source and said second DC source in such a manner that the two DC sources are in series when all of said at least one switching element are closed and the two DC sources are in parallel when all of said at least one switching element are open.

13. The inverter circuit according to claim 12, wherein:
said intermediate circuit capacitor is formed by at least two capacitances connected in series; and
said inverter is connected to a connection between said at least two capacitances of said intermediate circuit capacitor.

14. The inverter circuit according to claim 12, wherein:
said inverter has input connections; and
said step-up converter is one of at least two step-up converters connected in one of parallel or in series and connected to said input connections of said inverter or to said intermediate circuit capacitor.

* * * * *